(12) United States Patent
Zhi et al.

(10) Patent No.: US 12,445,361 B2
(45) Date of Patent: Oct. 14, 2025

(54) INFERENCE-ORIENTED METHOD AND SYSTEM FOR APPLICATION FLOW AND INDEX VECTORIZATION

(71) Applicant: SHANGHAI NETIS TECHNOLOGIES CO., LTD, Shanghai (CN)

(72) Inventors: Fenglin Zhi, Shanghai (CN); Xiaohua Cai, Shanghai (CN)

(73) Assignee: SHANGHAI NETIS TECHNOLOGIES CO., LTD, Shanghai (CN)

( * ) Notice: Subject to any disclaimer, the term of this patent is extended or adjusted under 35 U.S.C. 154(b) by 573 days.

(21) Appl. No.: 17/926,622

(22) PCT Filed: Dec. 17, 2021

(86) PCT No.: PCT/CN2021/138960
§ 371 (c)(1),
(2) Date: Nov. 20, 2022

(87) PCT Pub. No.: WO2022/206040
PCT Pub. Date: Oct. 6, 2022

(65) Prior Publication Data
US 2023/0186122 A1 Jun. 15, 2023

(30) Foreign Application Priority Data
Mar. 31, 2021 (CN) .......................... 202110352102.X (51) Int. Cl.
*H04L 43/04* (2022.01)
(52) U.S. Cl.
CPC ..................................... *H04L 43/04* (2013.01)
(58) Field of Classification Search
None
See application file for complete search history.

(56) References Cited

U.S. PATENT DOCUMENTS

| 8,682,812 B1 | 3/2014 | Ranjan et al. |
| 9,729,571 B1 | 8/2017 | Ferguson et al. |
| (Continued) | | |

FOREIGN PATENT DOCUMENTS

| CN | 104468403 A | 3/2015 |
| CN | 107431663 A | 12/2017 |
| (Continued) | | |

OTHER PUBLICATIONS

Guo Yang, Research on Optimization and Improvement of Feature Extraction and Traffic Flow Prediction Algorithms for Intelligent Transportation Big Data, PhD Thesis of South China University of Technology, A Dissertation Submitted for the Degree of Doctor of Philosophy, 2021, pp. 1-122.

(Continued)

*Primary Examiner* — Quang N Nguyen
(74) *Attorney, Agent, or Firm* — Bayramoglu Law Offices LLC (57) ABSTRACT

An inference-oriented method for application flow and index vectorization includes: S1: quantizing original index information of related devices with known network flows and current flows in a distributed system into tuples of a same type to obtain known network flow information tuples and index information tuples; S2: quantizing unknown network flows into tuples of a same type to obtain unknown network flow information tuples; S3: forming a network according to a time window and a priori association relationship based on the known network flow information tuples, the index information tuples, and the unknown network flow information tuples, and sampling network description information by means of random walk; S4: obtaining network flow vectors and index information vectors by means of an embedding algorithm based on the network description information; and S5: performing root cause analysis and index prediction (Continued)

according to the network flow vectors and the index information vectors.

10 Claims, 2 Drawing Sheets

(56) References Cited

U.S. PATENT DOCUMENTS

| | | | | |
|---|---|---|---|---|
| 11,134,044 | B1* | 9/2021 | Johansson | H04L 51/18 |
| 2002/0103772 | A1* | 8/2002 | Chattopadhyay | G06Q 50/06 |
| | | | | 705/400 |
| 2014/0082730 | A1 | 3/2014 | Vashist et al. | |
| 2022/0385546 | A1* | 12/2022 | Wong | H04L 41/145 |

FOREIGN PATENT DOCUMENTS

| | | |
|---|---|---|
| CN | 109257760 A | 1/2019 |
| CN | 109726744 A | 5/2019 |
| CN | 110210656 A | 9/2019 |
| CN | 111277570 A | 6/2020 |
| CN | 111310453 A | 6/2020 |
| CN | 111325326 A | 6/2020 |
| CN | 112019497 A | 12/2020 |
| CN | 113098735 A | 7/2021 |

OTHER PUBLICATIONS

Zheng Xu, et al., Using Association Link Network Model for Organizing Video Resources from Web, 2013 Ninth International Conference on Semantics, Knowledge and Grids, 2014, pp. 52-57.

* cited by examiner

INFERENCE-ORIENTED METHOD AND SYSTEM FOR APPLICATION FLOW AND INDEX VECTORIZATION

CROSS REFERENCE TO THE RELATED APPLICATIONS

This application is the national phase entry of International Application No. PCT/CN2021/138960, filed on Dec. 17, 2021, which is based upon and claims priority to Chinese Patent Application No. 202110352102.X, filed on Mar. 31, 2021, the entire contents of which are incorporated herein by reference.

TECHNICAL FIELD

The present disclosure relates to the fields of data processing, flow analysis, vectorization representation, and application performance monitoring, in particular to an inference-oriented method and system for application flow and index vectorization.

BACKGROUND

A distributed system generally refers to a software system built on a network, which has high cohesiveness and transparency and is widely applied in the business field, public field, and information technology (IT) infrastructure field. Correspondingly, the monitoring and representation aiming at the distributed system also have wide significance and application, such as operation and maintenance guarantee, security guarantee, data value mining, etc.

In the distributed system, application flow analysis plays a central role in the implementation of lots of work. In an existing method, different flow analysis models are generally built for different targets. For example, a model is built for anomaly detection, a model is built for root cause analysis, a model is built for flow prediction, etc. Flow information is respectively processed in the above models by reusing a large amount of computing resources, resulting in high repeated construction cost of various application systems.

In the field of text processing, a method for "word embedding" implies an inherent relationship between words in vector representation of each word, and these vectors may be used directly to perform some simple tasks (such as similarity comparison) or serve as common inputs for other types of models. In fact, a relationship between network flows is inherently present and may be reused for any application.

SUMMARY

In view of the defects in the prior art, an objective of the present disclosure is to provide an inference-oriented method and system for application flow and index vectorization.

The inference-oriented method for application flow and index vectorization provided by the present disclosure includes:

Step S1: quantizing original index information of related devices with known network flows and current flows in a distributed system into tuples of a same type to obtain known network flow information tuples and index information tuples;

Step S2: quantizing unknown network flows in the distributed system into tuples of a same type to obtain unknown network flow information tuples;

Step S3: forming a network according to a time window and a priori association relationship on the basis of the known network flow information tuples, the index information tuples, and the unknown network flow information tuples, and sampling network description information by means of random walk;

Step S4: obtaining network flow vectors and index information vectors by means of an embedding algorithm on the basis of the network description information; and Step S5: performing root cause analysis and index prediction according to the network flow vectors and the index information vectors, where each of the tuples includes a code and time, the code is a positive integer id, and the time is a flow starting time point or an index sampling time point.

Preferably, the Step Si includes:

Step S1.1: acquiring original flow information, and assigning a unique positive integer id to each type of known flow in the original flow information;

Step S1.2: acquiring the original index information of the related devices involving the current flows, assigning a unique positive integer id to each type of index information in the original index information, and when an index is a continuous value, assigning a unique positive integer id to each discrete value after discretization to obtain the index information tuples; and Step S1.3: extracting the known flows from original flows according to known flow rules, and recording the known flows as the known flow information tuples, where each of the flow rules includes a port, a protocol name, and a data packet format.

Preferably, the Step S2 includes:

Step S2.1: sampling historical flow information, in which unknown flows are on the basis of a same destination Internet protocol (IP), a same destination port, and a same basic protocol, in a preset time, and when an edit distance of first N characters of a message during aggregation is smaller than a preset value, aggregating the first N characters of a text of the message in each of the unknown flows, and assigning a unique positive integer id to each group of flows after aggregation; and Step S2.2: allocating new unknown flows to an aggregation generated in Step S2.1 according to a k-nearest neighbors (KNN) algorithm, assigning corresponding positive integers id to the allocated flows on the basis of the unique positive integer id assigned to each group of flows after aggregation, and recording the unknown flows as the unknown flow information tuples.

Preferably, the Step S3 includes:

Step S3.1: dividing continuous known flow tuples, unknown flow tuples, and index tuples into a set by using a sliding window with the step length S and the window length T, and marking each of the tuples as F, where S is less than T, namely, a front window and a rear window are overlapped with each other;

Step S3.2: sorting all the tuples F in the set of the time window T according to time in the set to form a linked list of the tuples F, reading in metadata association information, and directly connecting associated nodes F to form an association graph of the known flows, the unknown flows, and index elements;

Step S3.3: randomly selecting a starting point F on the association graph of the known flows, the unknown flows, and the index elements, and performing random walk on N nodes to generate a walk sequence $[F_1, F_2, \ldots F_N]$; and Step S3.4: selecting an unselected starting point F, performing walk again to generate a walk sequence, repeatedly performing Step S3.4 until more than a preset number of nodes are accessed, and outputting the walk sequence.

Preferably, the Step S4 includes: a walk sequence obtains a list of <positive integer id, vector> by means of the embedding algorithm; and the embedding algorithm includes Skip-gram, continuous bag of words (CBOW), and global vectors for word representation (GLOVE).

Preferably, the Step S5 includes:

Step S5.1: receiving a positive integer id and time t of a flow and/or an index needing to be subjected to root cause analysis, where when analyzed targets are the flow and the index, t is latest time in the flow and the index;

Step S5.2: reversely dividing historical flows/indexes along a time axis by taking t as a starting point, S as the step length, and T as the window size;

Step S5.3: accumulating vectors corresponding to positive integers id of all flows and/or indexes in divided windows, then calculating a mean as a characteristic of the current time window, and marking the characteristic as $V_{env}$;

Step S5.4: acquiring a vector corresponding to the id of the flow and/or index needing to be subjected to the root cause analysis, taking the vector as a characteristic of a target to be analyzed, and marking the characteristic as $V^{tar}$, where when the analyzed targets are the flow and the index, the vector is a mean of flow and index vectors;

Step S5.5: calculating a characteristic $V_{com}$ of the target to be analyzed in the current time window on the basis of a characteristic weighted sum or a characteristic mean according to the characteristic $V_{env}$ of the current time window and the characteristic $V_{tar}$ of the target to be analyzed; and Step S5.6: calculating the similarity between vectors corresponding to all flows and/or indexes in a previous time window and $V_{com}$, taking M flows and/or indexes with the similarity higher than a preset value as possible root causes in the previous time window, and repeatedly performing Step S5.3 to Step S5.6 until the flows and/or the indexes with the similarity higher than the preset value do not exist.

Preferably, the Step S5 further includes: calculating the similarity between all the flow and/or index vectors of the current time window and the characteristic $V_{env}$ of the current time window, where the flows/indexes corresponding to the most similar M vectors are possible predicted values.

The inference-oriented system for application flow and index vectorization provided by the present disclosure includes:

a module M1 for quantizing original index information of related devices with known network flows and current flows in a distributed system into tuples of a same type to obtain known network flow information tuples and index information tuples;

a module M2 for quantizing unknown network flows in the distributed system into tuples of a same type to obtain unknown network flow information tuples;

a module M3 for forming a network according to a time window and a priori association relationship on the basis of the known network flow information tuples, the index information tuples, and the unknown network flow information tuples, and sampling network description information by means of random walk;

a module M4 for obtaining network flow vectors and index information vectors by means of an embedding algorithm on the basis of the network description information; and a module M5 for performing root cause analysis and index prediction according to the network flow vectors and the index information vectors, where each of the tuples includes a code and time, the code is a positive integer id, and the time is a flow starting time point or an index sampling time point.

Preferably, the module M1 includes:

a module M1.1 for acquiring original flow information, and assigning a unique positive integer id to each type of known flow in the original flow information;

a module M1.2 for acquiring the original index information of the related devices involving the current flows, assigning a unique positive integer id to each type of index information in the original index information, and when an index is a continuous value, assigning a unique positive integer id to each discrete value after discretization to obtain the index information tuples; and a module M1.3 for extracting the known flows from original flows according to known flow rules, and recording the known flows as the known flow information tuples, where each of the flow rules includes a port, a protocol name, and a data packet format; and the module M2 includes:

a module M2.1 for sampling historical flow information, in which unknown flows are on the basis of a same destination IP, a same destination port, and a same basic protocol, in a preset time, and when an edit distance of first N characters of a message during aggregation is smaller than a preset value, aggregating the first N characters of a text of the message in each of the unknown flows, and assigning a unique positive integer id to each group of flows after aggregation; and a module M2.2 for allocating new unknown flows to an aggregation generated in the module M2.1 according to a KNN algorithm, assigning corresponding positive integers id to the allocated flows on the basis of the unique positive integer id assigned to each group of flows after aggregation, and recording the unknown flows as the unknown flow information tuples.

Preferably, the module M3 includes:

a module M3.1 for dividing continuous known flow tuples, unknown flow tuples, and index tuples into a set by using a sliding window with the step length S and the window length T, and marking each of the tuples as F, where S is less than T, namely, a front window and a rear window are overlapped with each other;

a module M3.2 for sorting all the tuples F in the set of the time window T according to time in the set to form a linked list of the tuples F, reading in metadata association information, and directly connecting associated nodes F to form an association graph of the known flows, the unknown flows, and index elements;

a module M3.3 for randomly selecting a starting point F on the association graph of the known flows, the unknown flows, and the index elements, and performing random walk on N nodes to generate a walk sequence $[F_1, F_2, \ldots F_N]$; and a module M3.4 for selecting an unselected starting point F, performing walk again to generate a walk sequence, repeatedly performing the module M3.4 until more than a preset number of nodes are accessed, and outputting the walk sequence; and the module M5 includes:

a module M5.1 for receiving a positive integer id and time t of a flow and/or an index needing to be subjected to root cause analysis, where when analyzed targets are the flow and the index, t is latest time in the flow and the index;

a module M5.2 for reversely dividing historical flows/indexes along a time axis by taking t as a starting point, S as the step length, and T as the window size;

a module M5.3 for accumulating vectors corresponding to positive integers id of all flows and/or indexes in divided windows, then calculating a mean as a characteristic of the current time window, and marking the characteristic as $V_{env}$;

a module M5.4 for acquiring a vector corresponding to the id of the flow and/or index needing to be subjected to the root cause analysis, taking the vector as a characteristic of a target to be analyzed, and marking the characteristic as $V^{tar}$, where when the analyzed targets are the flow and the index, the vector is a mean of flow and index vectors;

a module M5.5 for calculating a characteristic $V^{com}$ of the target to be analyzed in the current time window on the basis of a characteristic weighted sum or a characteristic mean according to the characteristic $V_{env}$ of the current time window and the characteristic $V_{tar}$ of the target to be analyzed; and a module M5.6 for calculating the similarity between vectors corresponding to all flows and/or indexes in a previous time window and $V_{com}$, taking M flows and/or indexes with the similarity higher than a preset value as possible root causes in the previous time window, and repeatedly performing the module M5.3 to the module M5.6 until the flows and/or the indexes with the similarity higher than the preset value do not exist; and the module M5 is further configured for calculating the similarity between all the flow and/or index vectors of the current time window and the characteristic $V_{env}$ of the current time window, where the flows/indexes corresponding to the most similar M vectors are possible predicted values.

Compared with the prior art, the present disclosure has the following beneficial effects:

1. The present disclosure innovatively introduces a method for "word embedding" in the field of flows, provides a representation method for application flow vectorization, and provides a specific operation method for flow vectorization.

2. According to the present disclosure, by means of such vector representation method, various follow-up frameworks and algorithms in the fields of artificial intelligence and deep neural networks may be applied in the field of flows, and various metric-based calculations are introduced to implement various inference tasks and prediction tasks.

3. According to the present disclosure, by means of such vector representation method, data sources may be replaced or current data sources may be supplemented in various fields of business monitoring, network performance analysis, network security, (network flow-based) service monitoring, network data (service) value mining, etc. by applying artificial intelligence methods or conventional methods and means such as rule engines, statistical analysis, etc., and various metric-based calculations are introduced to improve the accuracy and effectiveness of current various solutions.

4. The vector representation method in the present disclosure is a highly compressed recording method, may be widely used in scenarios such as long-term recording and storage, presentation, application-layer alarm calculation, similarity calculation, security intrusion budget, value mining, etc.

BRIEF DESCRIPTION OF THE DRAWINGS

Other features, objectives, and advantages of the present disclosure will become more apparent by reading the detailed description of non-limiting embodiments with reference to the following drawings.

DETAILED DESCRIPTION OF THE EMBODIMENTS

The present disclosure is described in detail below with reference to specific embodiments. The following embodiments will help those skilled in the art to further understand the present disclosure, but do not limit the present disclosure in any form. It should be noted that those of ordinary skill in the art may also make several variations and improvements without departing from the concept of the present disclosure. These variations and improvements fall within the scope of protection of the present disclosure.

Embodiment 1

An inference-oriented method for application flow and index vectorization provided by the present disclosure includes:

Step S1: quantizing original index information of related devices with known network flows and current flows in a distributed system into tuples of a same type to obtain known network flow information tuples and index information tuples;

Step S2: quantizing unknown network flows in the distributed system into tuples of a same type to obtain unknown network flow information tuples;

Step S3: forming a network according to a time window and a priori association relationship on the basis of the known network flow information tuples, the index information tuples, and the unknown network flow information tuples, and sampling network description information by means of random walk;

Step S4: obtaining network flow vectors and index information vectors by means of an embedding algorithm on the basis of the network description information; and Step S5: performing root cause analysis and index prediction according to the network flow vectors and the index information vectors, where each of the tuples includes a code and time, the code is a positive integer id, and the time is a flow starting time point or an index sampling time point.

Specifically, the Step S1 includes:

Step S1.1: acquiring original flow information, and assigning a unique positive integer id to each type of known flow in the original flow information;

Step S1.2: acquiring the original index information of the related devices involving the current flows, assigning a unique positive integer id to each type of index information in the original index information, and when an index is a continuous value, assigning a unique positive integer id to each discrete value after discretization to obtain the index information tuples; and Step S1.3: extracting the known flows from original flows according to known flow rules, and recording the known flows as the known flow information tuples, where each of the flow rules includes a port, a protocol name, and a data packet format.

Specifically, the Step S2 includes:

Step S2.1: sampling historical flow information, in which unknown flows are on the basis of a same destination Internet protocol (IP), a same destination port, and a same basic protocol, in a preset time, and when an edit distance of first N characters of a message during aggregation is smaller than a preset value, aggregating the first N characters of a text of the message in each of the unknown flows, and assigning a unique positive integer id to each group of flows after aggregation; and Step S2.2: allocating new unknown flows to an aggregation generated in Step S2.1 according to a k-nearest neighbors (KNN) algorithm, assigning corresponding positive integers id to the allocated flows on the basis of the unique positive integer id assigned to each group of flows after aggregation, and recording the unknown flows as the unknown flow information tuples.

Preferably, the Step S3 includes:

Step S3.1: dividing continuous known flow tuples, unknown flow tuples, and index tuples into a set by using a sliding window with the step length S and the window length T, and marking each of the tuples as F, where S is less than T, namely, a front window and a rear window are overlapped with each other;

Step S3.2: sorting all the tuples F in the set of the time window T according to time in the set to form a linked list of the tuples F, reading in metadata association information, and directly connecting associated nodes F to form an association graph of the known flows, the unknown flows, and index elements;

Step S3.3: randomly selecting a starting point F on the association graph of the known flows, the unknown flows, and the index elements, and performing random walk on N nodes to generate a walk sequence $[F_1, F_2, \ldots F_N]$; and Step S3.4: selecting an unselected starting point F, performing walk again to generate a walk sequence, repeatedly performing Step S3.4 until more than a preset number of nodes are accessed, and outputting the walk sequence.

Specifically, the Step S4 includes: a walk sequence obtains a list of <positive integer id, vector> by means of the embedding algorithm; and the embedding algorithm includes Skip-gram, continuous bag of words (CBOW), and global vectors for word representation (GLOVE).

Specifically, the Step S5 includes:

Step S5.1: receiving a positive integer id and time t of a flow and/or an index needing to be subjected to root cause analysis, where when analyzed targets are the flow and the index, t is latest time in the flow and the index;

Step S5.2: reversely dividing historical flows/indexes along a time axis by taking t as a starting point, S as the step length, and T as the window size;

Step S5.3: accumulating vectors corresponding to positive integers id of all flows and/or indexes in divided windows, then calculating a mean as a characteristic of the current time window, and marking the characteristic as $V_{env}$;

Step S5.4: acquiring a vector corresponding to the id of the flow and/or index needing to be subjected to the root cause analysis, taking the vector as a characteristic of a target to be analyzed, and marking the characteristic as $V^{tar}$, where when the analyzed targets are the flow and the index, the vector is a mean of flow and index vectors;

Step S5.5: calculating a characteristic $V_{com}$ of the target to be analyzed in the current time window on the basis of a characteristic weighted sum or a characteristic mean according to the characteristic $V_{env}$ of the current time window and the characteristic $V_{tar}$ of the target to be analyzed; and Step S5.6: calculating the similarity between vectors corresponding to all flows and/or indexes in a previous time window and $V_{com}$, taking M flows and/or indexes with the similarity higher than a preset value as possible root causes in the previous time window, and repeatedly performing Step S5.3 to Step S5.6 until the flows and/or the indexes with the similarity higher than the preset value do not exist.

Specifically, the Step S5 further includes: calculating the similarity between all the flow and/or index vectors of the current time window and the characteristic $V^{env}$ of the current time window, where the flows/indexes corresponding to the most similar M vectors are possible predicted values.

An inference-oriented system for application flow and index vectorization provided by the present disclosure may be implemented by means of steps in the inference-oriented method for application flow and index vectorization provided by the present disclosure. Those skilled in the art may understand the inference-oriented method for application flow and index vectorization as a preferred embodiment of the inference-oriented system for application flow and index vectorization.

Embodiment 2

Embodiment 2 is a preferred embodiment of Embodiment 1.

In view of the defects in an existing flow and index processing technology, the technical problems solved by the present disclosure are reflected in the following points:

1) A method for uniformly vectorizing application flows and related technical indexes is provided.

2) Vectorization results may be used for inference to achieve a variety of task goals.

As shown in FIGS. 1 to 4, an inference-oriented method for application flow and index vectorization provided by the present disclosure includes known flow and index coding, unknown flow coding, sampling, vectorization, and vector-based inference.

Figure 1:
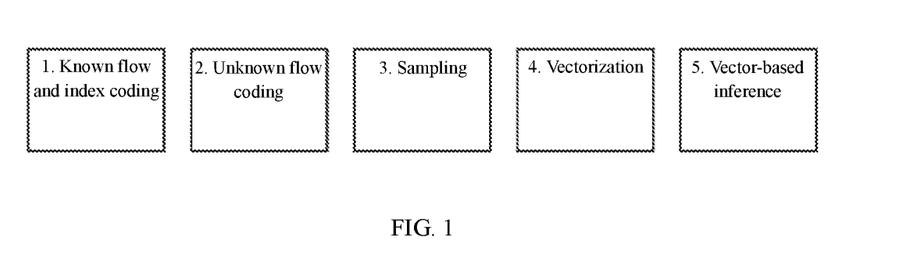
FIG. 1 is a schematic diagram of steps in the present disclosure.

Step 1: known flow and index coding, where input includes original flow information and original index information; and output includes known flow information tuples in the form of (code, time) and index information tuples in the form of (code, time).

Step 2: unknown flow coding, where input is unknown flow information; and output is unknown flow information tuples in the form of (code, time).

Known flows and unknown flows are two types of subdivisions adopted in the present disclosure as optimization means to improve the processing precision. For the implementation of the present disclosure, subsequent processing may be completely performed only by means of one of Step 1 and Step 2, or processing may be performed by adopting the known flows in Step 1 as the unknown flows in Step 2 completely.

Step 3: sampling, where input includes 1) metadata association information and 2) flow information tuples and index information tuples; and output is a list of associated samples, in which each element is in the form of (flow/information code 1, flow/information code 2 . . . flow/information code n). Step of sampling further includes a full sampling scenario with a sampling rate of 100%.

Step 4: vectorization, where input is the associated sample list; and output is a set of (code, vector) tuples.

Step 5: vector-based inference, where input is (code, time) tuple information; and output includes 1) a root cause analysis link of a current index and 2) index prediction at the next moment.

Figure 2:
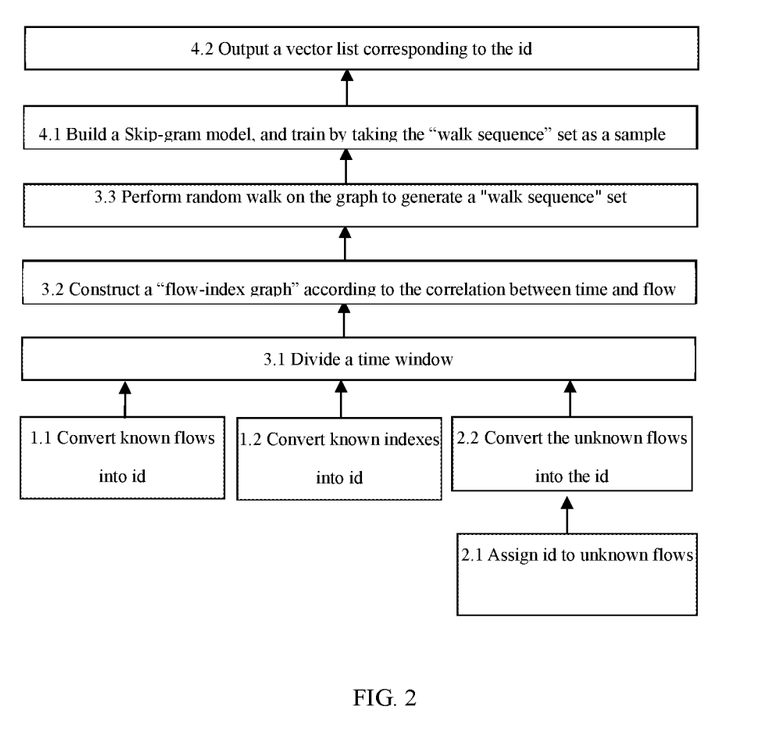
FIG. 2 is a schematic diagram of a process for generating flow/index vectors.

The inference-oriented method for application flow and index vectorization includes the following specific steps:

Step 1: known flow and index coding, referring to FIG. 2, specifically including:

Step 1.1: assigning a unique integer id to each type of known flow (such as including but not limited to a check-out operation of a financial system, a query request of a database system, etc.), assigning a unique integer id to each type of index information, and if the index is a continuous value, assigning a unique integer id to each discrete value after discretization (for example, respectively assigning an id to CPU_FREQ<20%, 20%<=CPU_FREQ<80%, and CPU_FREQ>=80%); and Step 1.2: extracting the known flows from original flows according to known flow rules (such as ports, protocol names, and data packet formats), and recording the known flows as (code, time) tuples, where the code is the id, and the time is a flow starting time point or an index sampling time point; and outputting the tuples.

Step 2: unknown flow coding, referring to FIG. 2, including:

Step 2.1: sampling historical flow information in a period of time, aggregating unknown flows according to <a destination Internet protocol (IP), a destination port, a basic protocol, and first N characters of a text of a message> (content with an edit distance of the first N characters of the message during aggregation being smaller than e is regarded as same content), and assigning a unique integer id to each group of flows after aggregation;

Step 2.2: allocating the unknown flows to an aggregation generated in Step 2.1 according to a k-nearest neighbors (KNN) algorithm, assigning id corresponding to the aggregation to the flows, and recording the flows as (code, time) tuples; and outputting the tuples.

Step 3: sampling, referring to FIG. 2, including:

Step 3.1: dividing continuous (code, time) flows into a set by using a sliding window with the step length S and the window length T (where S is less than T, namely, a front window and a rear window are overlapped with each other), and marking each of the (code, time) tuples as F;

Step 3.2: sorting all the tuples F in the time window T according to time in the time window to form a linked list of the tuples F, reading in metadata association information ("financial system audit" REL "financial system audit results", etc.), and directly connecting associated nodes F to form a "flow-index graph"; and Step S3.3: randomly selecting a starting point F on the graph in Step 2, performing random walk on N nodes to generate a walk sequence [F1, F2, . . . FN], then selecting an unselected starting point F, and performing walk again to generate a walk sequence; repeating the above process until more than P % of nodes are accessed; and outputting the walk sequence.

Step 4: vectorization, referring to FIG. 2, including:

Step 4.1: processing the walk sequence generated in Step 3 by using an embedding algorithm including but not limited to Skip-gram, continuous bag of words (CBOW), global vectors for word representation (GLOVE), etc., where the Skip-gram is taken as an example below, a neural network model for a Skip-gram structure is built, the walk sequences generated in Step 3 are input to the Skip-gram model for training, and each walk sequence is regarded as a "context"; and Step 4.2: obtaining a list of <id, vector> output by the Skip-gram.

Figure 3:
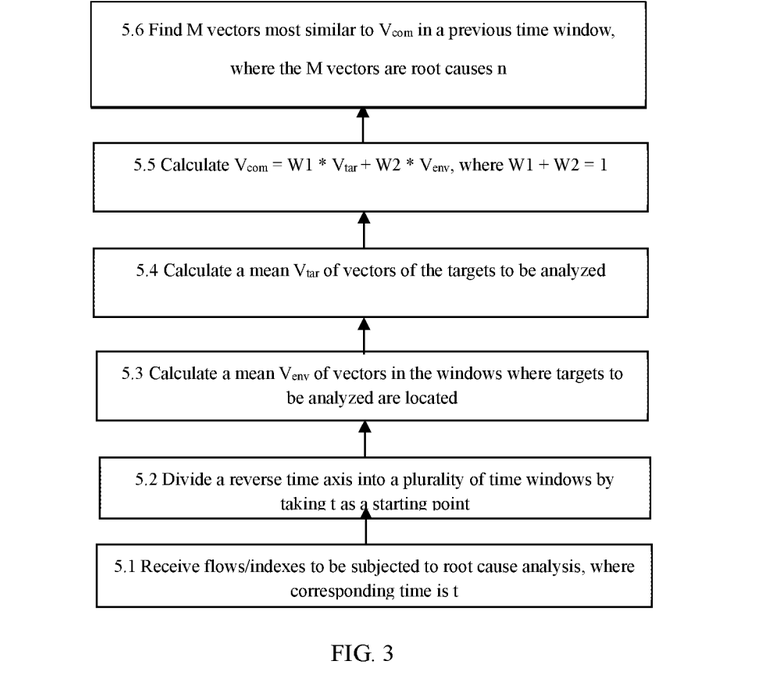
FIG. 3 is a schematic diagram of a process for inferring root causes.
Figure 4:
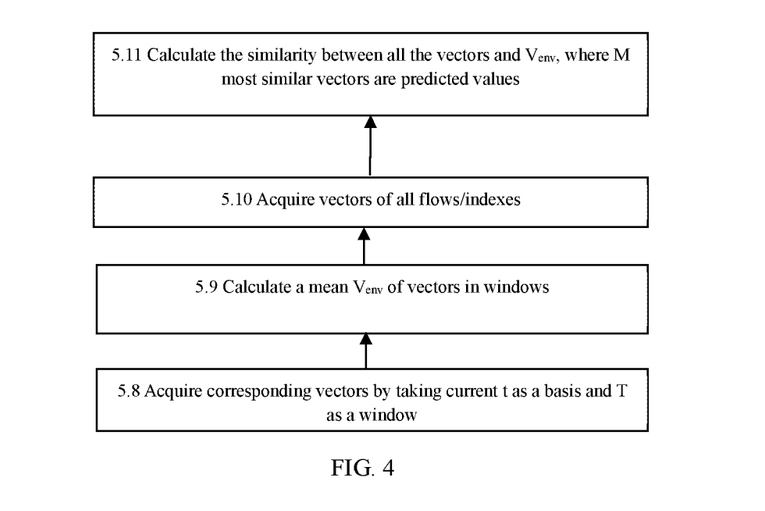
FIG. 4 is a schematic diagram of a prediction process.

Step 5: vector-based inference, referring to FIGS. 3 and 4, including:

Root cause inference of a current index:

Step 5.1: receiving an id and time t (if an analyzed target is a group, t is latest time in the group) of a (or a group of) flow/an (a group of) index needing to be subjected to root cause analysis;

Step 5.2: reversely dividing historical flows/indexes along a time axis by taking t as a basis (starting point), S as the step length, and T as the window size;

Step 5.3: accumulating vectors corresponding to id of all flows and/or indexes in divided windows, then calculating a mean as a characteristic of the current time window, and marking the characteristic as $V_{env}$;

Step 5.4: acquiring a vector corresponding to the id of the flow and/or index needing to be subjected to the root cause analysis (if there is a group of flows/indexes, the vector is a mean of vectors), taking the vector as a characteristic of a target to be analyzed, and marking the characteristic as $V_{tar}$;

Step 5.5: calculating a characteristic of the target to be analyzed in the current time window under the integration of $V_{env}$ and $V_{tar}$ means of various methods including but not limited to a characteristic weighted sum, a characteristic mean, etc., where in the present disclosure, calculation is made by using the following formula:

$$V_{com} = W_1 * V_{tar} + W_2 * V_{env}, \text{ where } W_1 + W_2 = 1, \text{ and}$$

$W_1$ and $W_2$ represent weights;

Step S5.6: calculating the similarity between vectors corresponding to all flows and/or indexes in a previous time window and $V_{com}$, taking M flows and/or indexes with the similarity higher than a preset value as possible root causes in the previous time window; and Step 5.7: if root causes need to continue being reversely searched for along the time axis, repeating Step 5.3 to Step 5.6, until the flows with the similarity higher than the preset value do not exist.

Subsequent flow/index predictive inference:

Step 5.8: reversely acquiring historical flow/index information along the time axis by taking a current moment t as a basis and T as the window size;

Step 5.9: accumulating vectors corresponding to id of all flows and/or indexes in windows, then calculating a mean as a characteristic of the time window, and marking the characteristic as $V_{env}$;

Step 5.10: acquiring vectors corresponding to all flows/indexes; and

Step 5.11: calculating the similarity between all the flow and/or index vectors and $V_{env}$, where the flows/indexes corresponding to the most similar M vectors are possible predicted values.

Those skilled in the art know that in addition to implementing the system, device, and modules thereof provided by the present disclosure by means of pure computer-readable program codes, the system, device, and modules thereof provided by the present disclosure may perform the same program in the form of logic gates, switches, application specific integrated circuits, programmable logic controllers, and embedded microcontrollers by logically programming method steps. Therefore, the system, device, and modules thereof provided by the present disclosure may be respectively regarded as a kind of hardware component, the modules, configured to perform various programs, in the system and device may be regarded as structures in the hardware component, and the modules configured to realize various functions may be regarded as either software programs for implementing methods or the structures in the hardware component.

The specific embodiments of the present disclosure are described above. It should be understood that the present disclosure is not limited to the above-mentioned specific implementations, and those skilled in the art may make various changes or modifications within the scope of the claims without affecting the essential content of the present disclosure. Without conflicts, the embodiments of the present disclosure and the features in the embodiments may be randomly combined with each other.

What is claimed is:

1. An inference-oriented method for an application flow and an index vectorization, comprising:
    Step S1: quantizing an original index information of related devices with known network flows and current flows in a distributed system into first tuples of a first same type to obtain known network flow information tuples and index information tuples;
    Step S2: quantizing unknown network flows in the distributed system into second tuples of a second same type to obtain unknown network flow information tuples;
    Step S3: forming a network according to a time window and a priori association relationship based on the known network flow information tuples, the index information tuples, and the unknown network flow information tuples, and sampling a network description information by a random walk;
    Step S4: obtaining network flow vectors and index information vectors by an embedding algorithm based on the network description information; and
    Step S5: performing a root cause analysis and an index prediction according to the network flow vectors and the index information vectors, wherein
    each of the known network flow information tuples, the index information tuples, and the unknown network flow information tuples comprises a code and a time, wherein the code is a first positive integer id, and the time is a flow starting time point or an index sampling time point.

2. The inference-oriented method for the application flow and the index vectorization according to claim 1, wherein the Step S1 comprises:
    Step S1.1: acquiring an original flow information, and assigning a first unique positive integer id to each type of known flows in the original flow information;
    Step S1.2: acquiring the original index information of the related devices involving the current flows, assigning a second unique positive integer id to each type of index information in the original index information, and when an index is a continuous value, assigning a third unique positive integer id to each discrete value after a discretization to obtain the index information tuples; and
    Step S1.3: extracting the known flows from original flows according to known flow rules, and recording the known flows as the known network flow information tuples, wherein
    each of the known flow rules comprises a port, a protocol name, and a data packet format.

3. The inference-oriented method for the application flow and the index vectorization according to claim 1, wherein the Step S2 comprises:
    Step S2.1: sampling historical flow information in a preset time, wherein in the historical flow information, unknown flows are based on a same destination Internet protocol (IP), a same destination port, and a same basic protocol, and when an edit distance of first N characters of a message during an aggregation is smaller than a preset value, aggregating the first N characters of a text of the message in each of the unknown flows, and assigning a fourth unique positive integer id to each group of flows after the aggregation; and
    Step S2.2: allocating new unknown flows to the aggregation generated in the Step S2.1 according to a k-nearest neighbors (KNN) algorithm, assigning corresponding positive integers id to the new unknown flows allocated based on the fourth unique positive integer id assigned to each group of the flows after the aggregation, and recording the new unknown flows as the unknown network flow information tuples.

4. The inference-oriented method for the application flow and the index vectorization according to claim 1, wherein the Step S3 comprises:
    Step S3.1: dividing continuous known flow tuples, unknown flow tuples, and index tuples into a set by using a sliding window with a step length S and a window length T, and marking each of the continuous known flow tuples, unknown flow tuples, and index tuples as F, wherein the step length S is less than the window length T, and a front window and a rear window are overlapped with each other;
    Step S3.2: sorting all the tuples F in a set of the time window according to time in the set of the time window to form a linked list of the tuples F, reading in metadata association information, and directly connecting associated nodes to form an association graph of the known flows, the unknown flows, and index elements;
    Step S3.3: randomly selecting a starting point on the association graph of the known flows, the unknown flows, and the index elements, and performing the random walk on N of the associated nodes to generate a first walk sequence $[F_1, F_2, \ldots F_N]$; and
    Step S3.4: selecting an unselected starting point, performing the random walk again to generate a second walk sequence, repeatedly performing the Step S3.4 until more than a preset number of nodes are accessed, and outputting a third walk sequence.

5. The inference-oriented method for the application flow and the index vectorization according to claim 1, wherein the Step S4 comprises: a walk sequence obtains a list of <positive integer id, vector> by the embedding algorithm; and
    wherein the embedding algorithm comprises Skip-gram, continuous bag of words (CBOW), and global vectors for word representation (GLOVE).

6. The inference-oriented method for the application flow and the index vectorization according to claim 1, wherein the Step S5 comprises:
    Step S5.1: receiving a second positive integer id and a time t of a flow and/or an index needing to be subjected to the root cause analysis, wherein when analyzed targets are the flow and the index, the t is a latest time in the flow and the index;
    Step S5.2: reversely dividing historical flows/indexes along a time axis by taking the t as a starting point, S as a step length, and T as a window size;

Step S5.3: accumulating vectors corresponding to second positive integers id of all the flows and/or the indexes in divided windows, then calculating a mean as a first characteristic of a current time window, and marking the first characteristic as $V_{env}$;

Step S5.4: acquiring a vector corresponding to the second positive integer id of the flow and/or the index needing to be subjected to the root cause analysis, taking the vector as a second characteristic of a target to be analyzed, and marking the second characteristic as $V_{tar}$, wherein when the analyzed targets are the flow and the index, the vector is a mean of a flow vector and an index vector;

Step S5.5: calculating a third characteristic $V_{com}$ of the target to be analyzed in the current time window based on a characteristic weighted sum or a characteristic mean according to the first characteristic $V_{env}$ of the current time window and the second characteristic $V_{tar}$ of the target to be analyzed; and Step S5.6: calculating a first similarity between the vectors corresponding to all the flows and/or the indexes in a previous time window and the third characteristic $V_{com}$, taking M flows and/or indexes with the first similarity higher than a preset value as possible root causes in the previous time window, and repeatedly performing the Step S5.3 to the Step S5.6 until the flows and/or the indexes with the first similarity higher than the preset value do not exist.

7. The inference-oriented method for the application flow and the index vectorization according to claim 6, wherein the Step S5 further comprises: calculating a second similarity between all the flow vectors and/or the index vectors of the current time window and the first characteristic $V_{env}$ of the current time window, wherein flows/indexes corresponding to most similar M vectors are possible predicted values.

8. An inference-oriented system for an application flow and an index vectorization, comprising:
modules, configured to perform various functions in the system, regarded as structures in a hardware component, the modules comprise:
a module M1 for quantizing an original index information of related devices with known network flows and current flows in a distributed system into first tuples of a first same type to obtain known network flow information tuples and index information tuples;
a module M2 for quantizing unknown network flows in the distributed system into second tuples of a second same type to obtain unknown network flow information tuples;
a module M3 for forming a network according to a time window and a priori association relationship based on the known network flow information tuples, the index information tuples, and the unknown network flow information tuples, and sampling a network description information by a random walk;
a module M4 for obtaining network flow vectors and index information vectors by an embedding algorithm based on the network description information; and
a module M5 for performing a root cause analysis and an index prediction according to the network flow vectors and the index information vectors, wherein each of the known network flow information tuples, the index information tuples, and the unknown network flow information tuples comprises a code and a time, wherein the code is a first positive integer id, and the time is a flow starting time point or an index sampling time point.

9. The inference-oriented system for the application flow and the index vectorization according to claim 8, wherein the module M1 comprises:
a module M1.1 for acquiring an original flow information, and assigning a first unique positive integer id to each type of known flows in the original flow information;
a module M1.2 for acquiring the original index information of the related devices involving the current flows, assigning a second unique positive integer id to each type of index information in the original index information, and when an index is a continuous value, assigning a third unique positive integer id to each discrete value after a discretization to obtain the index information tuples; and
a module M1.3 for extracting the known flows from original flows according to known flow rules, and recording the known flows as the known network flow information tuples, wherein
each of the known flow rules comprises a port, a protocol name, and a data packet format; and
wherein the module M2 comprises:
a module M2.1 for sampling historical flow information in a preset time, wherein in the historical flow information, unknown flows are based on a same destination IP, a same destination port, and a same basic protocol, and when an edit distance of first N characters of a message during an aggregation is smaller than a preset value, aggregating the first N characters of a text of the message in each of the unknown flows, and assigning a fourth unique positive integer id to each group of flows after the aggregation; and
a module M2.2 for allocating new unknown flows to the aggregation generated in the module M2.1 according to a KNN algorithm, assigning corresponding positive integers id to the new unknown flows allocated based on the fourth unique positive integer id assigned to each group of the flows after the aggregation, and recording the new unknown flows as the unknown network flow information tuples.

10. The inference-oriented system for the application flow and the index vectorization according to claim 8, wherein the module M3 comprises:
a module M3.1 for dividing continuous known flow tuples, unknown flow tuples, and index tuples into a set by using a sliding window with a step length S and a window length T, and marking each of the continuous known flow tuples, unknown flow tuples, and index tuples as F, wherein the step length S is less than the window length T, and a front window and a rear window are overlapped with each other;
a module M3.2 for sorting all the tuples F in a set of the time window according to time in the set of the time window to form a linked list of the tuples F, reading in metadata association information, and directly connecting associated nodes to form an association graph of the known flows, the unknown flows, and index elements;
a module M3.3 for randomly selecting a starting point on the association graph of the known flows, the unknown flows, and the index elements, and performing the random walk on N of the associated nodes to generate a first walk sequence $[F_1, F_2, \ldots F_N]$; and
a module M3.4 for selecting an unselected starting point, performing the random walk again to generate a second walk sequence, repeatedly performing the module M3.4 until more than a preset number of nodes are accessed, and outputting a third walk sequence; and wherein the module M5 comprises:

a module M5.1 for receiving a second positive integer id and a time t of a flow and/or an index needing to be subjected to the root cause analysis, wherein when analyzed targets are the flow and the index, the t is a latest time in the flow and the index;

a module M5.2 for reversely dividing historical flows/indexes along a time axis by taking the t as a starting point, S as a step length, and T as a window size;

a module M5.3 for accumulating vectors corresponding to second positive integers id of all the flows and/or the indexes in divided windows, then calculating a mean as a first characteristic of a current time window, and marking the first characteristic as $V_{env}$;

a module M5.4 for acquiring a vector corresponding to the second positive integer id of the flow and/or the index needing to be subjected to the root cause analysis, taking the vector as a second characteristic of a target to be analyzed, and marking the second characteristic as $V_{tar}$, wherein when the analyzed targets are the flow and the index, the vector is a mean of a flow vector and an index vector;

a module M5.5 for calculating a third characteristic $V_{com}$ of the target to be analyzed in the current time window based on a characteristic weighted sum or a characteristic mean according to the first characteristic $V_{env}$ of the current time window and the second characteristic $V_{tar}$ of the target to be analyzed; and a module M5.6 for calculating a first similarity between the vectors corresponding to all the flows and/or the indexes in a previous time window and the third characteristic $V_{com}$, taking M flows and/or indexes with the first similarity higher than a preset value as possible root causes in the previous time window, and repeatedly performing the module M5.3 to the module M5.6 until the flows and/or the indexes with the first similarity higher than the preset value do not exist; and wherein the module M5 is further configured for calculating a second similarity between all the flow vectors and/or the index vectors of the current time window and the first characteristic $V_{env}$ of the current time window, wherein flows/indexes corresponding to most similar M vectors are possible predicted values.

* * * * *